(12) United States Patent
Luo et al.

(10) Patent No.: US 7,904,535 B2
(45) Date of Patent: Mar. 8, 2011

(54) METHOD OF CLUSTER MANAGEMENT OF NETWORK DEVICES AND APPARATUS THEREOF

(75) Inventors: Jiewen Luo, Shenzhen (CN); Anping Hu, Shenzhen (CN); Haiyin Ma, Shenzhen (CN)

(73) Assignee: Huawei Technologies Co., Ltd., Shenzhen, Guangdong Province (CN)

(*) Notice: Subject to any disclaimer, the term of this patent is extended or adjusted under 35 U.S.C. 154(b) by 1124 days.

(21) Appl. No.: 10/537,488

(22) PCT Filed: Aug. 26, 2003

(86) PCT No.: PCT/CN03/00720
§ 371 (c)(1),
(2), (4) Date: Jun. 3, 2005

(87) PCT Pub. No.: WO2004/051927
PCT Pub. Date: Jun. 17, 2004

(65) Prior Publication Data
US 2006/0041650 A1    Feb. 23, 2006

(30) Foreign Application Priority Data

Dec. 4, 2002   (CN) .................................. 02 1 51018

(51) Int. Cl.
G06F 15/173   (2006.01)
G06F 15/16    (2006.01)
(52) U.S. Cl. ........................................ 709/223; 709/208
(58) Field of Classification Search .................. 709/208, 709/217, 220, 222, 223, 238
See application file for complete search history.

(56) References Cited

U.S. PATENT DOCUMENTS

| 6,058,431 A | * | 5/2000 | Srisuresh et al. | 709/245 |
| 6,128,664 A | * | 10/2000 | Yanagidate et al. | 709/228 |
| 6,167,052 A | | 12/2000 | McNeill et al. | |

(Continued)

FOREIGN PATENT DOCUMENTS

CN    1411214 A    4/2003

(Continued)

OTHER PUBLICATIONS

Cisco Systems, Inc.—XP-002387375, "Catalyst 2900 Series XI and Catalyst 3500 Series XL, Software Configuration Guide", Jan. 2002, pp. iii-120.

(Continued)

Primary Examiner — Asad M Nawaz
Assistant Examiner — Esther Benoit
(74) Attorney, Agent, or Firm — Ladas & Parry, LLP

(57) ABSTRACT

An object of the present invention is to provide a management method of network device, which can implement concentrate management of a large number of network devices with a small amount of IP resources, and thereby reducing maintenance workload and facilitating network management. In the management method of network devices according to the present invention, the plurality of network devices compose a cluster, wherein at least one network device is designated as the cluster management device and is configured with a public IP address; other network devices are configured and updated with private IP addresses and routes by said cluster management device; the network management device manages the network devices in the cluster through the following steps: (A) establishing IP data channels via said cluster management device between the network devices in the cluster and said network management device by said cluster management device; and (B) managing the network devices in the cluster through said IP data channels by said network management device.

12 Claims, 4 Drawing Sheets

U.S. PATENT DOCUMENTS

| | | | |
|---|---|---|---|
| 6,654,796 B1* | 11/2003 | Slater et al. | 709/220 |
| 6,725,264 B1* | 4/2004 | Christy | 709/225 |
| 6,917,626 B1* | 7/2005 | Duvvury | 370/466 |
| 7,035,858 B2* | 4/2006 | Dinker et al. | 707/10 |
| 2001/0023459 A1* | 9/2001 | Asami | 709/245 |
| 2002/0040397 A1* | 4/2002 | Choi | 709/226 |
| 2002/0165972 A1 | 11/2002 | Chien et al. | |
| 2003/0115298 A1* | 6/2003 | Baker | 709/220 |
| 2008/0162594 A1* | 7/2008 | Poston | 707/202 |

FOREIGN PATENT DOCUMENTS

| | | |
|---|---|---|
| JP | 2000-59385 | 2/2000 |
| WO | WO 02/21276 | 3/2002 |

OTHER PUBLICATIONS

M. Borella, (3Com Corp.), J. Lo (NEC USA), D. Grabelsky 3Com Corp., G. Montenegro Sun Microsystems, "Realm Specific IP: Framework", Jul. 2000, pp. 1-31.

Cisco Systems, Inc., "Catalyst 2900 Series XL and Catalyst 3500 Series XL, Software Configuration Guide", May 2002, pp. iii-367.

First EPO Office Action for EPO Application No. 03812116.6 mailed on Oct. 18, 2006.

Third Japanese Office Action for Japanese Application No. 2004-555961 mailed on Jun. 12, 2007.

* cited by examiner

METHOD OF CLUSTER MANAGEMENT OF NETWORK DEVICES AND APPARATUS THEREOF

CROSS-REFERENCE TO RELATED APPLICATIONS

This application is a U.S. National Stage of International Application No. PCT/CN03/00720 filed on Aug. 26, 2003, which claims priority to Chinese Patent Application No. CN02151018.0 filed on Dec. 4, 2002, both of which are hereby incorporated by reference in their entireties.

FIELD OF THE INVENTION

The present invention relates to a network device management method, particularly to a method of managing Transfer Control Protocol/Internet Protocol network devices and an apparatus thereof in a cluster manner.

BACKGROUND OF THE INVENTION

As network scale and scope enlarge quickly, people's activities rely on network services more and more, and the network load becomes heavier and heavier; whether from the viewpoint of network subscribers or from the viewpoint of network administrators, it is increasingly urgent to manage networks effectively.

In today's network environments, there are mainly 3 approaches for management of network devices, which are described as follows respectively.

The first approach is to connect a network management device directly to network devices to be managed via serial ports, to implement configuration management of the network devices. The major advantage of the approach lies in its simple management means, without needing other additional devices; furthermore, since the network devices to be managed are connected directly via serial ports, it is unnecessary to allocate management IP addresses to them when they are configured, and thereby save IP resource. However, since the network devices may be distributed in a large area, in particular, in a telecom network, there are a large number of data devices distributed across the network, such a management approach will inevitably bring difficulties to maintenance work and cause heavy workload.

The second approach is to manage TCP/IP network devices remotely on the basis of the Single Network Management Protocol (SNMP) or the terminal emulation protocol TELNET. Compared with the first approach, since the network management procedure is implemented on a standard IP protocol stack, it is simple to implement and light in workload; in addition, it has little correlation with other devices, so that the administrator can implement remote management of network devices to be managed through a network management terminal or TELNET emulation terminal; however, the major disadvantage is: each network device to be managed has to be allocated with a public network IP address, which will result in waste of IP address resource; especially, in a telecom network with a large number of devices, that disadvantage is more severe.

The last approach is put forth on the basis of the second approach; its core idea is to take the serial numbers of network devices allocated by the device manufacturer as device addresses to implement management of network devices; therefore, such an approach can save IP address resource; however, it is applicable to devices from a specific manufacturer and the network management program runs on a private protocol stack and thereby the management protocol nearly has no openness and is unable to implement unified management of network devices from different manufacturers.

SUMMARY OF THE INVENTION

An object of the present invention is to provide a method of cluster management of network devices, which can implement concentrate management of a large number of TCP/IP network devices with a small amount of IP address resource, and thereby reduces maintenance workload and simplifies network management.

Another object of the present invention is to provide an apparatus of cluster management of network devices.

To attain above objects, in the method of cluster management of network devices of the present invention, a plurality of network devices compose a cluster, wherein at least one network device is set as the cluster management device and configured with a public IP address; other network devices are configured and updated with private IP addresses and routes by said cluster management device; said cluster management device manages the network devices in the cluster according to the following steps of:

(A) establishing IP data channels via said cluster management device between the network devices in the cluster and said network management device by said cluster management device; and (B) managing the network devices in the cluster through said IP data channels by said network management device.

Preferably, in above managing method of network devices, said cluster management device configures and updates other network devices with private IP addresses and routes according to information of topological architecture of the network and device information of the network devices in the cluster. More preferably, said cluster management device configures the other network devices with private IP addresses dynamically.

Preferably, in above managing method of network devices, said cluster comprises a plurality of said cluster management devices, and one of the cluster management devices is responsible for managing the configuration and update of private IP addresses and routes of the network devices in the cluster as well as the communication between said network management device and the network devices in the cluster; in case said cluster management device fails, one of the other cluster management devices is designated to be responsible for managing the configuration and update of private IP addresses and routes of the network devices in the cluster as well as the communication between said network management device and the network devices in the cluster, according to a predetermined policy.

In the present invention, the plurality of network devices compose a cluster through the following steps:

(1) designating a device in the network as the cluster management device and configuring the device correspondingly by the network management device;

(2) initiating a topology acquisition process to acquire information of topological architecture of the network within a specified number of hops in the network by the cluster management device;

(3) designating candidate devices to be added to the cluster in the topological architecture according to the information of topological architecture acquired from the cluster management device, and informing the cluster management device to start the cluster member device addition process by the network management device;

(4) adding the designated candidate devices to the cluster and configures the candidate devices correspondingly by the cluster management device, so as to make the candidate devices become member devices of the cluster;

(5) after the cluster is established, managing the member devices in the cluster by the cluster management device, and forwarding management messages which are from outside of the cluster and destined to the member devices through standard Network Address Translation (NAT) process to corresponding member devices to process, and processing the management messages according to normal processing process by the member devices.

Said configuring the cluster management device correspondingly as described in step (1) includes configuring the following items on the device: cluster name, enable state of cluster, management IP address pool of cluster, state retention time of cluster, handshaking time interval of member devices, role of the cluster management device in the cluster, and IP address of the cluster management device.

The process of adding candidate network devices to the cluster in step (4) comprises:

(A1) sending cluster addition requests to candidate network devices that can be added to the cluster by the cluster management device;

(A2) determining whether it can be added to the cluster or not according to its own condition by each candidate device; if the candidate device can not be added to the cluster, feeding back a reject response and terminating the cluster addition process; otherwise feeding back an accept response to the cluster management device;

(A3) after receiving the response from the candidate device and if the candidate device agrees to be added to the cluster, sending a configuration message containing private IP address, member number, handshaking interval, state retention time, etc. to said candidate device by the cluster management device; after receiving the message, configuring the candidate device correspondingly, and sending a complete response to the cluster management device after the configuration.

In step (A2), determining whether the candidate device itself can be added to the cluster is implemented through determining whether the candidate device has already been in another cluster and whether software version in the candidate device supports cluster management.

In step (A2), before feeding back the accept response to be added to the cluster to the cluster management device, the candidate device will determine whether a super user password is set on itself; if a super user password has not been set, the candidate device feeds back the accept response message to be added to the cluster directly; if a super user password has been set, the candidate device feeds back an authentication request to the cluster management device; then, the candidate device authenticates itself according to the authentication information sent from the cluster management device; if the authentication is successful, the candidate device feeds back the accept response to be added to the cluster; otherwise feeds back a reject response to be added to the cluster to the cluster management device.

The necessary configuration for each member device added to the cluster in step (4) includes configuring each member device with the following items: member device number, private IP address of member device, name of member device, state of member device, operating state of member device, and cluster management password.

The configuration of each member device added to the cluster in step (4) is performed with a data structure comprising the following fields:

network type: designed to identify the type of network where the device is;

physical address: designed to identify the physical address of the device in the network.

In above network device management method, in step (1), said cluster management device establishes IP data channels via said cluster management device between said network management device and the network devices in the cluster with stream transform technology or network address translation technology.

The cluster management apparatus for network devices according to the present invention comprises: a cluster device manager and a member device connected with the cluster device manager; wherein:

said cluster device manager comprises:

an address translation module, designed to perform network address translation for management messages of member devices;

a Dynamic Host Configuration Protocol (DHCP)-like module, designed to accomplish allocation of private IP addresses to member network devices;

a first cluster member management module, which is connected with the address translation module A11, the DHCP-like module A12 and a topological information processing module A14 individually, and designed to manage member network devices in a concentrate manner, and to forward management messages, which are from outside of the cluster and destined to member devices, to respective member devices to process, so that the member devices can process the management messages according to normal processing process;

a first topological information processing module, designed to detect the topological architecture of network and to acquire the information of topological architecture of network within a specified number of hops in the network;

said member device comprises:

a second cluster member management module, designed to accomplish cluster management at the member device end;

a second topological information processing module, designed to accomplish detection of adjacent devices and response/forwarding of topology acquisition requests.

It can be seen from above description that the present invention can be implemented on the existing IP protocol stack through configuring each member device added to the cluster (including allocating private IP addresses and identifying); therefore, it is simple to implement and has good openness, facilitating management of network devices from different manufacturers; through the use of private IP addresses in management of the network devices, it saves valuable public IP address resource; in addition, since the present invention uses standard NAT to forward device management messages, it is easy to be implemented in hardware, and thereby enhances universality of the present invention and reduces the load on CPUs of the management devices, and implements concentrate management of a large number of network devices; therefore, with the present invention, effective cluster management of network devices can be implemented.

DETAILED DESCRIPTION OF THE EMBODIMENTS

The core idea of the present invention is: a plurality of network devices compose a cluster; wherein the network device designated as the cluster management device is allocated with a public IP address, other network devices use a private IP address segment configured and updated by the cluster management device; the cluster management device is the only external management interface of the entire cluster; in other words, whenever the network management device tries to access or manage any network device in the cluster, an IP data channel via the cluster management device has to be established. In this way, the network devices in the cluster are managed in a concentrate manner. Above public IP address may be configured by the network management device outside of the cluster or configured on the cluster management device by the subscriber.

Figure 1:
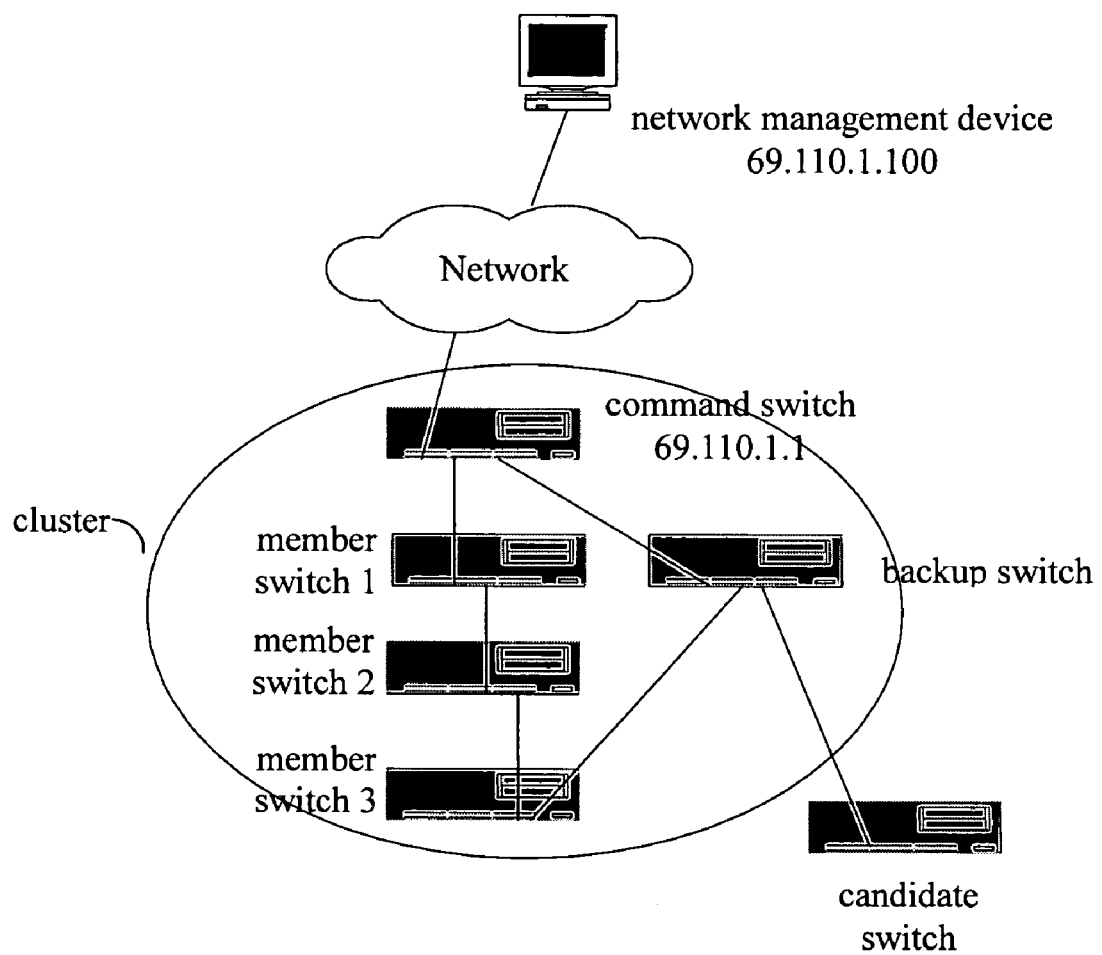
FIG. 1 is a schematic diagram of the cluster management system with the method of the present invention.

FIG. 1 is a schematic diagram of the cluster management system with the method of the present invention. As shown in FIG. 1, the IP address of the network management device station (i.e., network management device) is 69.110.1.100; the network administrator designates a network device in the cluster as the command switch (usually a Lay-3 switch or a network device with higher performance) and allocates a public IP address 69.110.1.1 to it (e.g., configure via the command line interface of the network management device or that of the command switch); there is also a backup switch (usually a Lay-3 switch or a network device with higher performance) in the cluster and member switches 1~3 (usually a Lay-2 switch or low-end network device with similar function). In the cluster shown in FIG. 1, the command switch is equivalent to the cluster management device, and is responsible for establishment, concentrate management, and maintenance of the entire cluster network, including addition/deletion of member devices, maintenance of states of member devices, and information acquisition of topological architecture of the cluster network, e.g., allocating private IP addresses and routes to the member switches. To enhance reliability of network management and avoid the effect of single point failure to cluster management function, a backup switch or backup cluster management device shall also be configured, so that the backup switch can take over the task of the command switch to continue to manage the entire cluster network in a concentrate manner in case the command switch fails. After member devices are added to the cluster, the user can manage them remotely through the command switch, including configuration and inquiry operations. In addition, a switch with cluster management function may also determine whether to add in the cluster by its configuration, for instance, the candidate switch with cluster management function as shown in FIG. 1.

To save public IP address resource as far as possible, for a cluster, only the command switch in the cluster is allocated with a public IP address, and other network devices with cluster management function are not allocated with public IP addresses; in case the command switch fails, the public IP address of the command switch is allocated to the substituting backup switch, or a new public IP address may be allocated to the backup switch which substitutes the command switch. After such a switching, the specific cluster configuration update will be started and accomplished by the new command switch.

Figure 2:
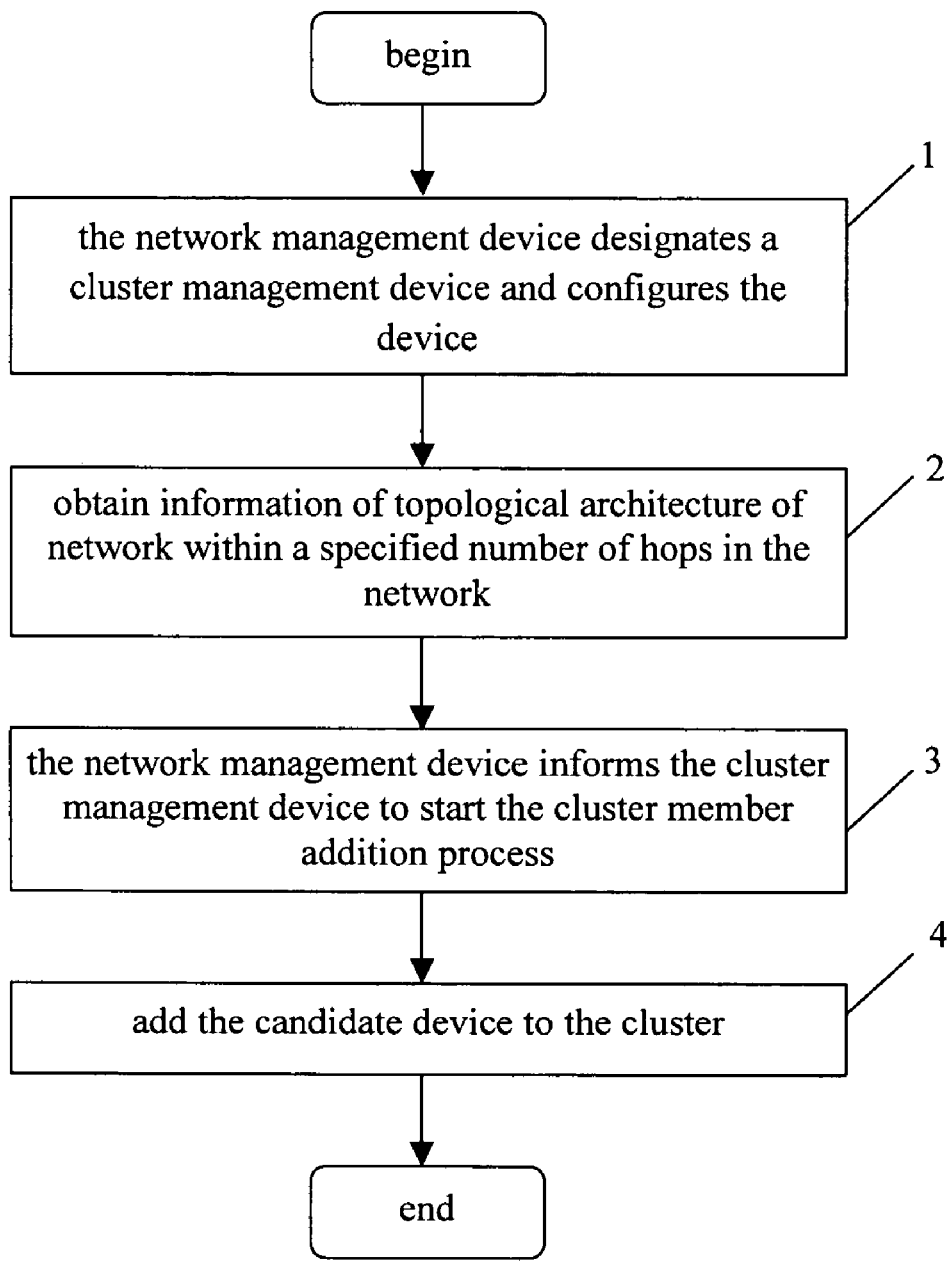
FIG. 2 is a flow diagram of the method with which a plurality of network devices compose a cluster according to the present invention.

During concentrate management of the network devices with the standard protocol stack and private IP address segment according to the present invention, the plurality of network devices compose a cluster through the following steps, as shown in FIG. 2, which shows the detailed embodiment. Firstly, in step 1, a device (usually a Lay-3 switch or a network device with higher performance) in the network is designated as the cluster management device by the network management device or by the user through command line, and then the device is configured correspondingly; in the embodiment, the items configured include:

cluster name: the name that identifies the managed cluster;

cluster enable state: designed to identify whether the managed cluster is in enabled state;

cluster management IP address pool: the private IP address segment configured for member devices;

cluster retention time: designed to indicate the duration after which the member is deemed as disconnected from the management device if no handshaking message from the member device is received;

handshaking time interval: designed to configure the time interval at which handshaking messages are sent between the member device and the management device;

role of the management device in the cluster: designed to identify whether the device is a management device or a member device;

management IP address of the management device: the IP address designed to identify the management device for communication in the cluster.

In step 2, the scope of management cluster is determined first; to this end, it is required that the network management device determines the number of hops for acquisition of network topology, and then, the cluster management device initiates a topology acquisition process to acquire information of topological architecture of the network within a specified number of hops in the network, in order to acquire information of managed devices to be added into the management cluster, the information including MAC address and interconnection port number of each managed device;

In step 3, the network management device/command line user decides whether to establish a device management cluster according to the topological information acquired by the cluster management device and other relevant information; for instance, in case there are a few devices, the scope of the management cluster shall be reselected, instead of establishing the management cluster immediately. If a management cluster can be established, the network management device/command line user notifies the cluster management device to start the member device addition process.

In step 4, the cluster management device determines the candidate devices that can be added into the cluster and adds the determined candidate devices to the cluster so that the devices become member devices of the cluster; at the same time, the cluster management device configures each member device added to the cluster, including allocating private IP address and member number. (In a practical communication network, a device need not be connected to Internet or another dedicated network in some instances; in this case, it is unnecessary to follow the regulations for IP address application and registration, and that device may use any address, e.g., a private IP address. RFC 1597 (Address Allocation for Private Internets) defines the following IP address segments for use as private addresses:

Class A addresses: 10.0.0.0 to 10.255.255.255
Class B addresses: 172.16.0.0 to 172.31.255.255.255
Class C addresses: 192.168.0.0 to 192.168.255.255

Therefore, above private IP addresses may be used in management of devices in the cluster.

The configuration (including allocating private IP address and member number) to each member device added to the cluster including configuring the following items:

cluster name: designed to identify the name of the cluster where the current switch is;

cluster password: which is a uniform cluster management password, designed to authenticate management processes in the cluster;

member device number: designed to identify the device uniquely in the cluster. It is an internal number for indexing in the implementation;

private IP address of member device: which is the network address of the member device for communication in the IP network;

IP address of the management device: designed for IP-based communication between the member devices and the management device in the cluster;

name of member device: designed to identify the member device.

In the embodiment, the identification of each member device that is added to the cluster is performed with the data structure comprising the following fields:

| type (2 bytes) | Reserved (2 bytes) | Physical Address of Device in the network (6 bytes) |
|---|---|---| network type (Type): designed to identify the type of the network where the device is;

physical address: designed to identify the physical address of the device in the network and represented with characters.

There are 10 bytes in all in above structure, wherein the Type field comprises 2 bytes, the Physical Address field comprises 6 bytes, the Reserved field comprises 2 bytes for other uses. With above structure, it is unnecessary to use manufacturer-defined device identification methods. The method is favorable to ensure uniqueness of each device; and device uniqueness is ensured by uniqueness of the physical address. Furthermore, such an identification is not limited to a certain physical network, for example, if Type=0, the physical address of device in the network is expressed as an Ethernet address. The Type may be extended according to the physical network where the device is.

Figure 3:
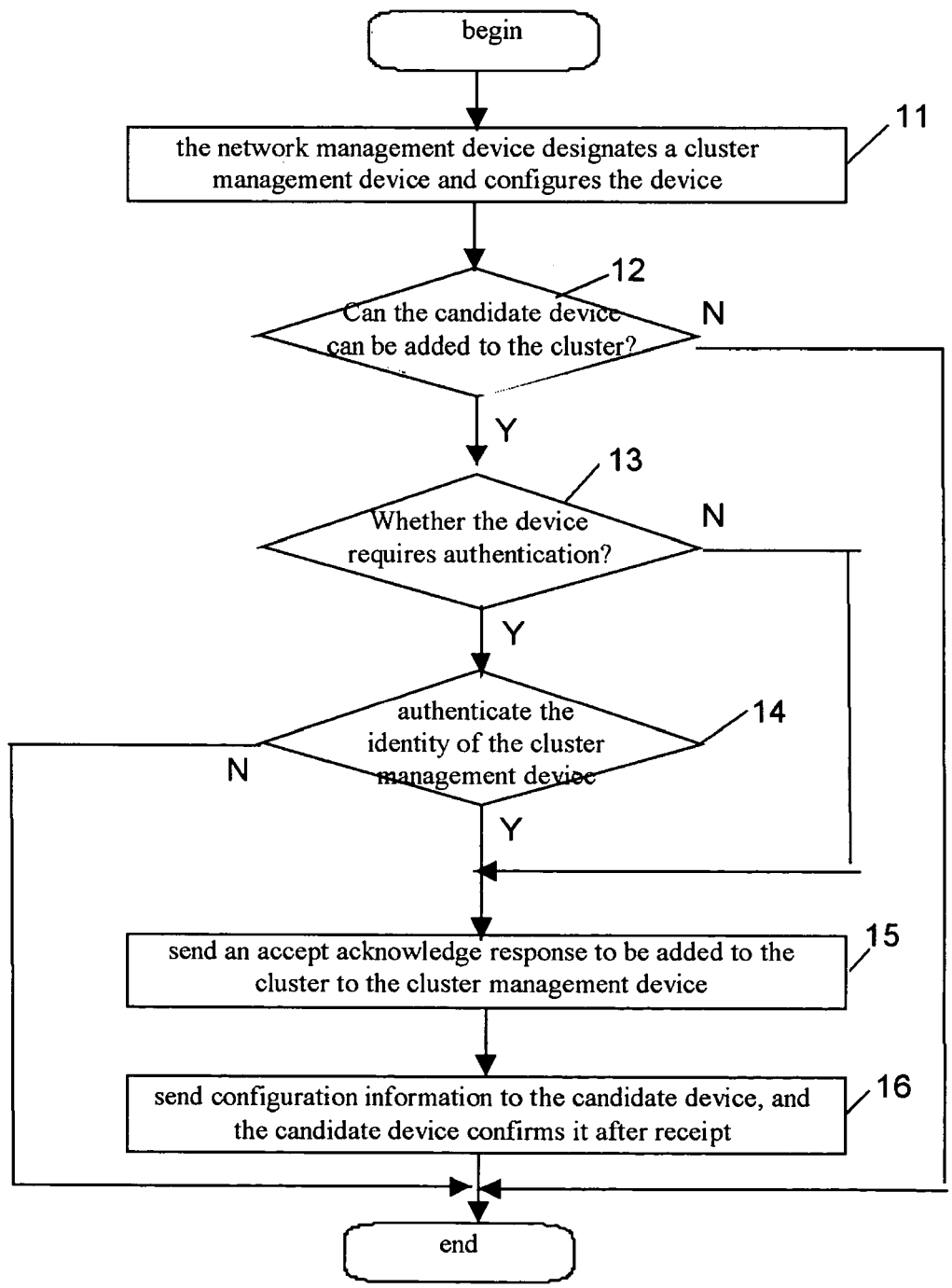
FIG. 3 is a flow diagram of adding a candidate network device to the cluster, which is used in the method shown in FIG. 2.

In above step 4, the process through which a candidate network device is added to the cluster comprises the following steps, referring to FIG. 3:

in step 11, the cluster management device sends a cluster addition request to the candidate network device that can be added to the cluster. In step 12, the candidate device determines whether it can be added to the cluster according to its condition, e.g., whether the candidate device is in another cluster, or whether the software version in the device support cluster management; if the candidate device can not be added to the cluster, it terminates the addition process and feeds back a reject response to be added to the cluster to the cluster management device; otherwise, in step 13, the candidate device determines whether a super user password is set; if not, authentication is unnecessary, and the candidate device feeds back an accept response directly; if the device has set a password, the candidate device authenticates the cluster management device in step 14; if the authentication is successful, the candidate device feeds back an accept response in step 15; otherwise the candidate device feeds back a reject message and terminates the cluster addition operation.

The device authentication operation described above is as follows: first, the candidate device returns a message containing a challenge for authentication to the cluster management device; after receiving the message, the cluster management device utilizes the challenge to encrypt the authentication information including the authentication password of the candidate network device (which may be a cluster management password sent by the cluster management device), and then encapsulates the authentication information into a response message, and sends the message to the respective candidate device; after the candidate device authenticates and confirms the identity of the cluster management device, it returns an accept acknowledge message to the cluster management device.

In step 16, after receiving the accept response from the candidate network device, the cluster management device allocates a cluster member identifier, a private IP address for management, and other configuration information to the candidate network device, encapsulates the information and a password (may be encrypted) into a configuration message, and sends the message to the candidate device; after receiving the message, the candidate device parses out the configuration information including the password, the cluster management number, and the management private IP address therein, and records the configuration information sent from the cluster management device, then, the candidate network device changes its role to a member switch, and then returns a complete message to the cluster management device; after receiving the complete message from the candidate network device, the cluster management device identifies the candidate network device as a cluster member. Thus, the candidate device addition process ends.

Figure 4:
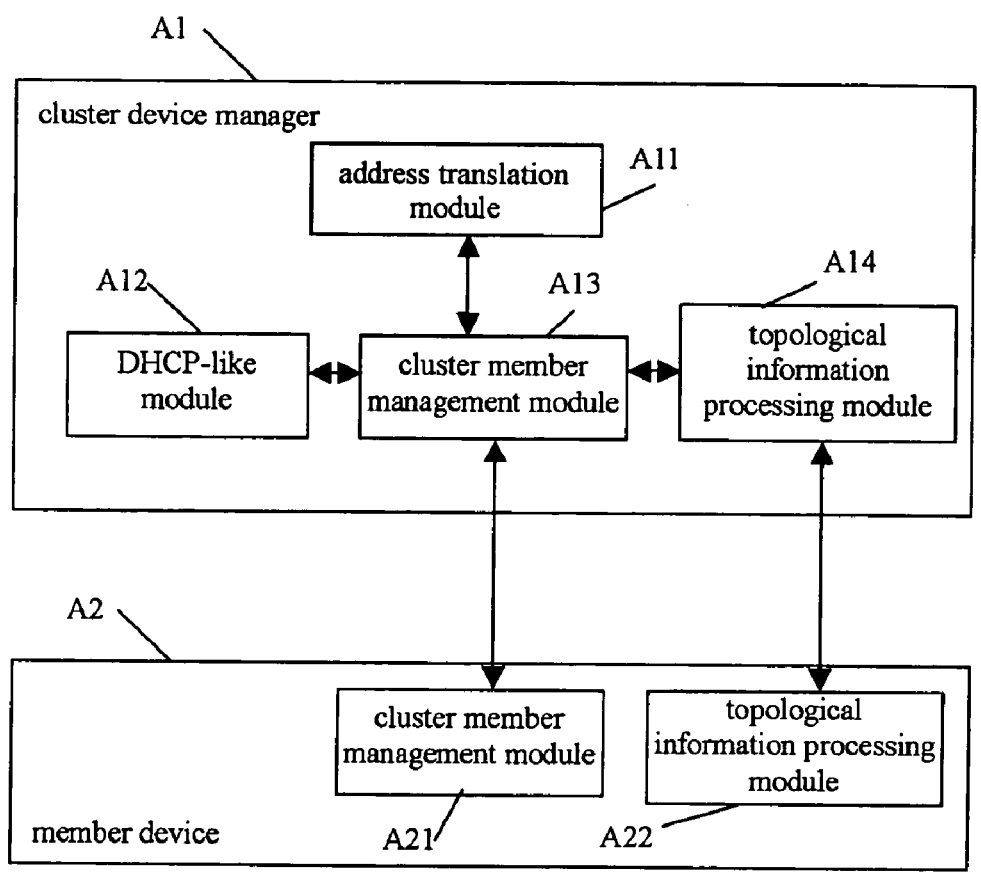
FIG. 4 is a structural block diagram of an embodiment of the apparatus according to the present invention.

FIG. 4 is a structural block diagram of an embodiment of the apparatus according to the present invention. The cluster management apparatus for network devices shown in the diagram comprises a cluster device manager A1 disposed at the command switch end and a cluster member device manager A2 at the member switch end, wherein:

the cluster device manager A1 is disposed in the cluster management device and is designed to implement cluster management of member devices, comprising:

an address translation module A11, designed to perform network address translation for management messages of member devices;

a DHCP-like module A12, designed to accomplish allocation of private IP addresses to member network devices;

a cluster member management module A13, which is connected with the address translation module A11, the DHCP-like module A12 and a topological information processing module A14 individually, and designed to manage member network devices in a concentrate manner, and to forward management messages, which are from outside of the cluster and destined to member devices, to respective member devices to process, so that the member devices can process the management messages according to normal processing procedures;

a topological information processing module A14, designed to detect the topological architecture of network and to acquire the information of topological architecture of network within a specified number of hops in the network;

the member device A2 is designed to implement management at the member device side in the cluster management, comprising:

a cluster member management module A21, designed to accomplish cluster management at the member device end;

a topological information processing module A22, designed to accomplish detection of adjacent devices and response/forwarding of topology acquisition requests.

When above apparatus is used for cluster management of network devices, first, the topological information processing module A14 acquires information of topological architecture of network within a specified number of hops in the network through the topological information processing module A22 at the candidate device side, and sends the information to the cluster member management module A13; the cluster member management module A13 sends a cluster addition request to the cluster member management module A21 in the candidate device that can be added to the cluster; the cluster member management module A21 determines whether to be added to the cluster according to its conditions, and feeds back an accept or a reject response to the cluster member management module A13; when the cluster member management module A13 receives an accept message from the candidate device, the DHCP-like module A12 performs allocation of a private IP address of member network device and sends the private IP address, together with configuration information including member number, handshaking interval, and state retention time etc, to the cluster member management module A21 in the candidate device via the cluster member management module A13; the cluster member management module A21 uses the information to configure the candidate device accordingly, and feeds back a complete response to the cluster management device after the configuration operation. After the candidate device becomes a member device of the cluster, the management messages, which are from outside of the cluster and destined to the member device, will be processed in standard network address translation at the translation module A11 and then forwarded to the cluster member management module A21 of the respective member device via the cluster member management module A13, so that the member device can process the management messages through usual processing procedures.

Hereunder a preferred embodiment of implementing cluster management in the cluster shown in FIG. 1 is described with reference to FIG. 4. As shown in FIG. 4, a translation module A11, a DHCP-like module A12, a cluster member management module A13, and a topological information processing module A14 are disposed at the command switch end; a cluster member management module A21 and a topological information processing module A22 are disposed in each member switch. Hereunder the function of each module and the cooperative working flow among the modules are described.

The topological information processing module shown in FIG. 4 is designed to acquire information of topological architecture of network and that of network devices; in particular, the topological information processing module implements network device detection function and obtain information of topological architecture of network through processing the acquired information of devices, e.g., device type and software/hardware version.

After power on, the topological information processing modules in the command switch and the member switch send topological information processing messages, containing information of the devices in which the respective modules are, to other surrounding immediate adjacent devices periodically; at the same time, they also receive topological information processing messages containing information of device from surrounding adjacent devices and process the information correspondingly; for instance, if the received message is from an unregistered new device overtime, the topological information processing module adds a new entry in the information buffer of adjacent devices to store information of the new device, and begins timing for the new entry; if the module hasn't yet received any new message from a registered device within a specified time period overtime, it ages the corresponding entry; if the information contained in the received message from is different from the information previously stored in the registered device, it updates the previously stored information, and restarts timing. The periodical transmission of information of device (topological information processing message) by the topological information processing module may be implemented with a timer; for instance, when the timer reaches to the set value, the module begins to send the information of device (topological information processing message); after the transmission is completed, the timer resets and restarts timing. In addition, the transmission of information of device (topological information processing message) is independent to standard spanning tree protocol (STP), it may be performed as long as there are physical connections between the network devices. The topological information processing messages will pass through STP-blocked ports, but they are forbidden to be forwarded, i.e., the topological information processing messages are only valid within 1 hop range. In this way, the device always knows the state and topological architecture of its adjacent devices.

When the information of topological architecture of network is required or a cluster is to be established, the topological information processing module may be triggered to acquire information through the following steps: first, the acquisition scope is configured at the acquisition initiating device (the device may not always be the command switch; when necessary, a member device may also be the acquisition initiator), then, the topological information processing module of the device sends an acquisition request to the surrounding adjacent devices. After the topological information processing module of a surrounding adjacent device receives the request, it returns a response message containing the information of device to the initiating device and decreases the number of hops by 1; if the number of hops is not equal to 0 after it is decreased by 1, the topological information processing module of the adjacent device forwards the request to its adjacent network devices; otherwise it stops forwarding. To avoid flooding resulted from repeated message sending and loop, the topological information processing module shall send or forward the request messages depending on STP tree. The topological information processing module of the acquisition initiating device processes the response message containing the information of device to obtain the information of topological architecture of network within the acquisition scope. To ensure integrity and availability of the information of topological architecture of network, the topological information processing module performs acquisition and processing on the data link layer.

After obtaining the information of topological architecture of network through the topological information processing module, the command switch begins to establish a cluster. In particular, first, the cluster member management module at the command switch end obtains information of relevant candidate switches (i.e., network devices that can be added to the cluster but haven't been added to) from the topological information processing module, and then cooperates with the cluster member management module of each candidate switch to add the candidate switches to the cluster in auto mode (i.e., add all candidate switches to the cluster automatically) or manual mode (i.e., the user specifies the candidate switches to be added to the cluster from the list of candidate devices). If the user has known the information (e.g., MAC Address) of the candidate network device, the step of acquiring the information of topological architecture performed by the topological information processing module may be omitted, and the user may add the device to the cluster through manual operation directly.

When a candidate switch is added to the cluster, the member management module at the command switch end treats the managed device (the candidate member switch) as a special user, and allocate a private IP address and configure the candidate member device with relevant route dynamically through the DHCP-like module, so that an IP data channel between the command switch and the member switch is established in the cluster. After the member device is configured with a private IP address, an IP data channel for communication inside the cluster and outside the cluster shall also be established. To this end, the cluster member management module at the command switch end also configures the member device with the private IP address translation policy through the translation module when the member device is added, and establishes an IP data channel so that network management device station outside the cluster can access the member devices inside the cluster, or the member devices can access the network management device station. The conversion may be performed with stream transform technology or NAT technology. In conclusion, through above configuration, an IP data channel between the network management device and a member switch is established via the command switch, and the user can manage the plurality of devices in the cluster with a public IP address through the remote network management station.

After a member switch is added to the cluster, the member switch can start the handshaking process with the command switch through respective cluster member management modules, so as to maintain the state of cluster.

Besides above primary function modules, backup modules (not shown) can also be used to implement backup function for the command switch, i.e., through designating a backup switch, the management function of the command switch can be handed over to the designated backup command switch with the specified policy in case the command switch fails, and thereby system halt resulted from single point failure at the command switch can be avoided.

The invention claimed is:

1. A management method of network devices comprising the following steps of:
    (A) composing, by a plurality of network devices, a cluster through the following steps:
        (1) designating, by a processor, a device in a network as a cluster management device and configuring the device correspondingly by a network management device, wherein the cluster management device comprises: an address translation module adapted to perform network address translation for management messages of member devices, a Dynamic Host Configuration Protocol (DHCP)-like module adapted to accomplish allocation of private IP addresses to member network devices, and a topological information processing module adapted to acquire information of topological architecture of a network;
        (2) initiating a topology acquisition process to acquire information of topological architecture of the network within a specified number of hops in the network by the cluster management device;
        (3) designating candidate devices to be added to the cluster in the topological architecture according to the information of topological architecture acquired from the cluster management device, and informing the cluster management device to start the cluster member device addition process by the network management device;
        (4) adding the designated candidate devices to the cluster and configures the candidate devices correspondingly by the cluster management device, so as to make the candidate devices become member devices of the cluster;
        (5) after the cluster is established, managing the member devices in the cluster by the cluster management device, and forwarding management messages which are from outside of the cluster and destined to the member devices through a standard Network Address Translation (NAT) process of the address translation module, to corresponding member devices to process; and processing the management messages according to a normal processing process by the member devices;
    the process of adding candidate network devices to the cluster comprises:
        (A1) sending cluster addition requests to candidate network devices that can be added to the cluster by the cluster management device;
        (A2) determining whether it can be added to the cluster or not according to its own condition by each candidate device; if the candidate device can not be added to the cluster, feeding back a reject response and terminating the cluster addition process; otherwise feeding back an accept response to the cluster management device;
        (A3) after receiving the response from the candidate device and if the candidate device agrees to be added to the cluster, sending a configuration message containing private IP address, member number, handshaking interval, and state retention time to said candidate device by the cluster management device;
    after receiving the message, configuring the candidate device correspondingly, and sending a complete response to the cluster management device after the configuration;
    (B) establishing IP data channels via the cluster management device between the network devices in the cluster and the network management device by the cluster management device, the cluster management device configuring the network devices with a data structure comprising following fields:
    network type: designed to identify the type of network where the device is; and
    physical address: designed to identify the physical address of the device in the network, wherein at least one of the network devices in the cluster is designated as the cluster management device and configured with a public IP address;
    the network devices in the cluster are configured and updated with private IP addresses and routes by the cluster management device; and
    (C) managing the network devices in the cluster through said IP data channels via the cluster management device by said network management device.

2. The method according to claim 1, wherein said cluster management device configures and updates other network devices with private IP addresses and routes according to information of topological architecture of the network and device information of the network devices in the cluster.

3. The method according to claim 2, wherein said cluster management device configures the other network devices with private IP addresses dynamically.

4. The method according to claim 1, wherein said cluster comprises a plurality of said cluster management devices, and one of the cluster management devices is responsible for managing the configuration and update of private IP addresses and routes of the network devices in the cluster as well as the communication between said network management device and the network devices in the cluster; in case said cluster management device fails, one of the other cluster management devices is designated to be responsible for managing the configuration and update of private IP addresses and routes of the network devices in the cluster as well as the communication between said network management device and the network devices in the cluster, according to a predetermined policy.

5. The method according to claim 4, wherein in step (B), said cluster management device establishes IP data channels via said cluster management device between the network devices in the cluster and said network management device with network address translation technology.

6. The method according to claim 1, wherein said configuring the cluster management device correspondingly as described in step (1) includes configuring the following items on the device: cluster name, enable state of cluster, management IP address pool of cluster, state retention time of cluster, handshaking time interval of member devices, role of the cluster management device in the cluster, and IP address of the cluster management device.

7. The method according to claim 1, wherein in step (A2), determining whether the candidate device itself can be added to the cluster is implemented through determining whether the candidate device has already been in another cluster and whether software version in the candidate device supports cluster management.

8. The method according to claim 1, wherein in step (A2), before feeding back the accept response to be added to the cluster to the cluster management device, the candidate device will determine whether a super user password is set on itself; if a super user password has not been set, the candidate device feeds back the accept response message to be added to the cluster directly; if a super user password has been set, the candidate device feeds back an authentication request to the cluster management device; then, the candidate device authenticates itself according to the authentication information sent from the management device; if the authentication is successful, the candidate device feeds back the accept response to be added to the cluster; otherwise feeds back a reject response to be added to the cluster to the cluster management device.

9. The method according to claim 1, wherein necessary configuration for each member device added to the cluster in step (4) includes configuring each member device with the following items: member device number, private IP address of member device, name of member device, state of member device, operating state of member device, and cluster management password.

10. A cluster management apparatus for network devices comprising:
a cluster device manager and a cluster member device connected with the cluster device manager;
the cluster device manager comprises:
a processor and a memory;
an address translation module, adapted to perform network address translation for management messages of cluster member devices;
a Dynamic Host Configuration Protocol (DHCP)-like module, adapted to accomplish allocation of private IP addresses to member network devices;
a first cluster member management module, which is connected with the address translation module, the DHCP-like module, and a first topological information processing module individually, and adapted to manage member network devices in a concentrate manner, and to forward management messages, which are from outside of the cluster and destined to cluster member devices through a standard Network Address Translation (NAT) process of the address translation module, to respective cluster member devices to process, so that the cluster member devices can process the management messages according to a normal processing process;
the first topological information processing module, adapted to detect the topological architecture of a network and to acquire the information of topological architecture of the network within a specified number of hops in the network;
the cluster device manager configuring the cluster member devices with a data structure comprising the following fields:
network type: designed to identify the type of network where the cluster member device is; and
physical address: designed to identify the physical address of the cluster member device in the network;
the cluster member device comprises:
a second cluster member management module, adapted to accomplish cluster management at the cluster member device;
a second topological information processing module;
wherein, the first topological information processing module acquires information of topological architecture of the network within a specified number of hops in the network through a topological information processing module at a candidate device, and sends the information to the first cluster member management module;
the first cluster member management module sends a cluster addition request to a cluster member management module at the candidate device that can be added to the cluster;
the cluster member management module at the candidate device determines whether the candidate device can be added to the cluster according to its conditions, and feeds back an accept or a reject response to the first cluster member management module;
when the first cluster member management module receives an accept message from the candidate device, the DHCP-like module performs allocation of a private IP address of member network device and sends the private IP address, together with configuration information including member number, handshaking interval, and state retention time, to the second cluster member management module;
the cluster member management module at the candidate device uses the information to configure the candidate device correspondingly, and sends back a complete response to the cluster management device after the configuration operation.

11. The method according to claim 1, wherein the step (2) is performed to acquire information of managed devices to be added into the cluster, the information including MAC address and interconnection port number of each managed device.

12. The cluster management apparatus according to claim 10, wherein the address translation module processes in standard network address translation the management messages, which are from outside of the cluster and destined to the cluster member device after the candidate device becomes a member device of the cluster and the management messages are forwarded to the second cluster member management module of a respective member device via the first cluster member management module.

* * * * *